United States Patent [19]
Tribe et al.

[11] 3,806,206
[45] Apr. 23, 1974

[54] MODULATING VALVE FOR SKID CONTROL SYSTEM

[75] Inventors: Leonard T. Tribe, Ann Arbor; Peter Every, Livonia, both of Mich.

[73] Assignee: Kelsey-Hayes Company, Romulus, Mich.

[22] Filed: May 14, 1973

[21] Appl. No.: 360,132

Related U.S. Application Data

[62] Division of Ser. No. 165,179, July 22, 1971, Pat. No. 3,752,538.

[52] U.S. Cl.............. 303/21 F, 188/181 A, 303/10
[51] Int. Cl............................................... B60t 8/04
[58] Field of Search.................. 303/21 F, 61–63, 303/68–69, 10; 188/181

[56] References Cited
UNITED STATES PATENTS

| | | | |
|---|---|---|---|
| 3,556,615 | 1/1971 | Stelzer | 303/21 F |
| 3,560,056 | 2/1971 | Stelzer | 303/21 F |
| 3,602,554 | 8/1971 | Ichimura | 303/21 F |
| 3,610,702 | 10/1971 | MacDuff | 303/21 F |
| 3,664,714 | 5/1972 | Every | 303/21 F |
| 3,666,328 | 5/1972 | Williams | 303/21 F |

Primary Examiner—Duane A. Reger
Assistant Examiner—D. C. Butler
Attorney, Agent, or Firm—Harness, Dickey & Pierce

[57] ABSTRACT

A hydraulically actuated modulating valve actuable to modulate the fluid pressure in a brake system in response to a skid control signal and operable from a source of hydraulic pressure as provided by a power steering pump or the like.

5 Claims, 7 Drawing Figures

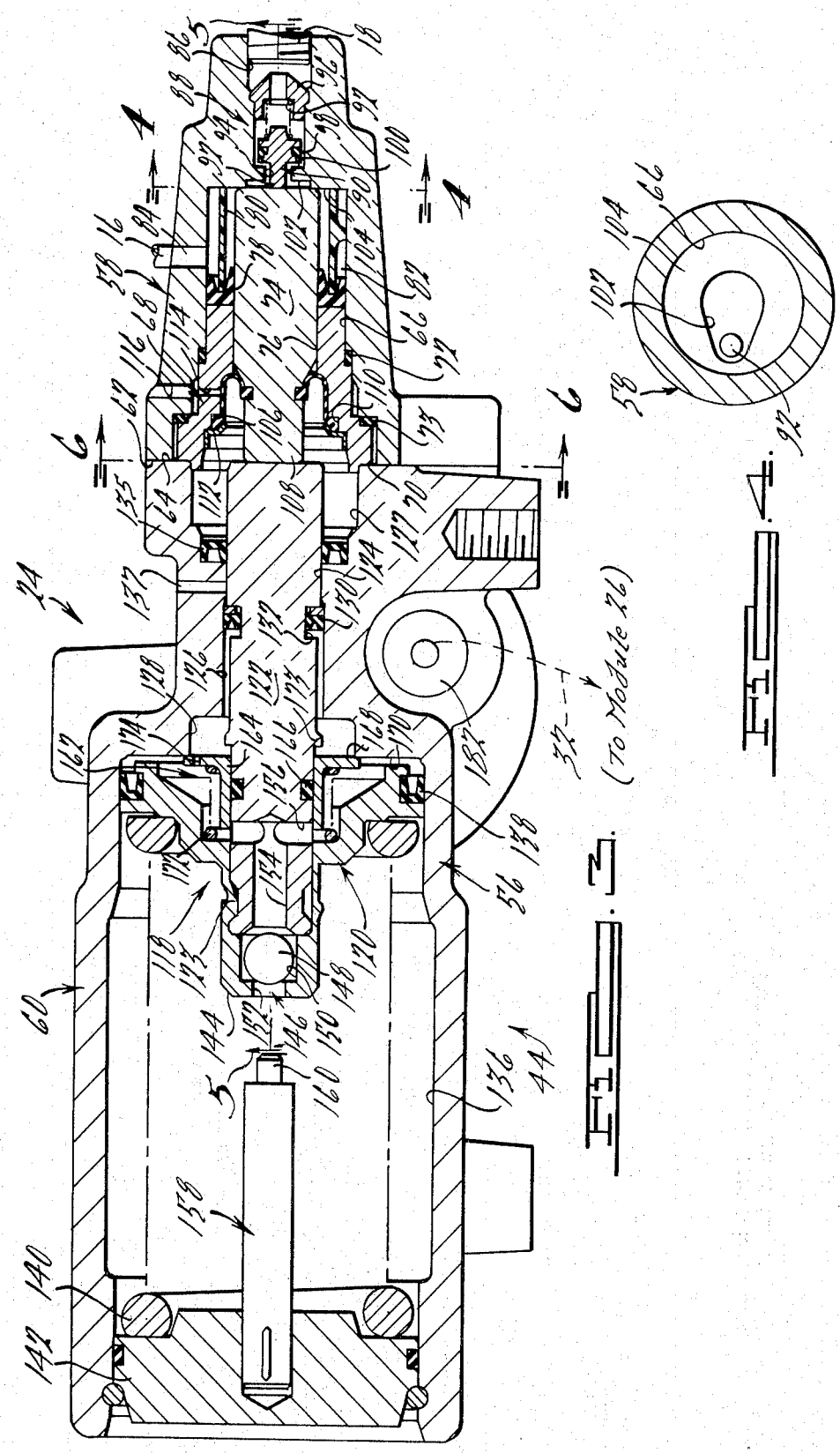

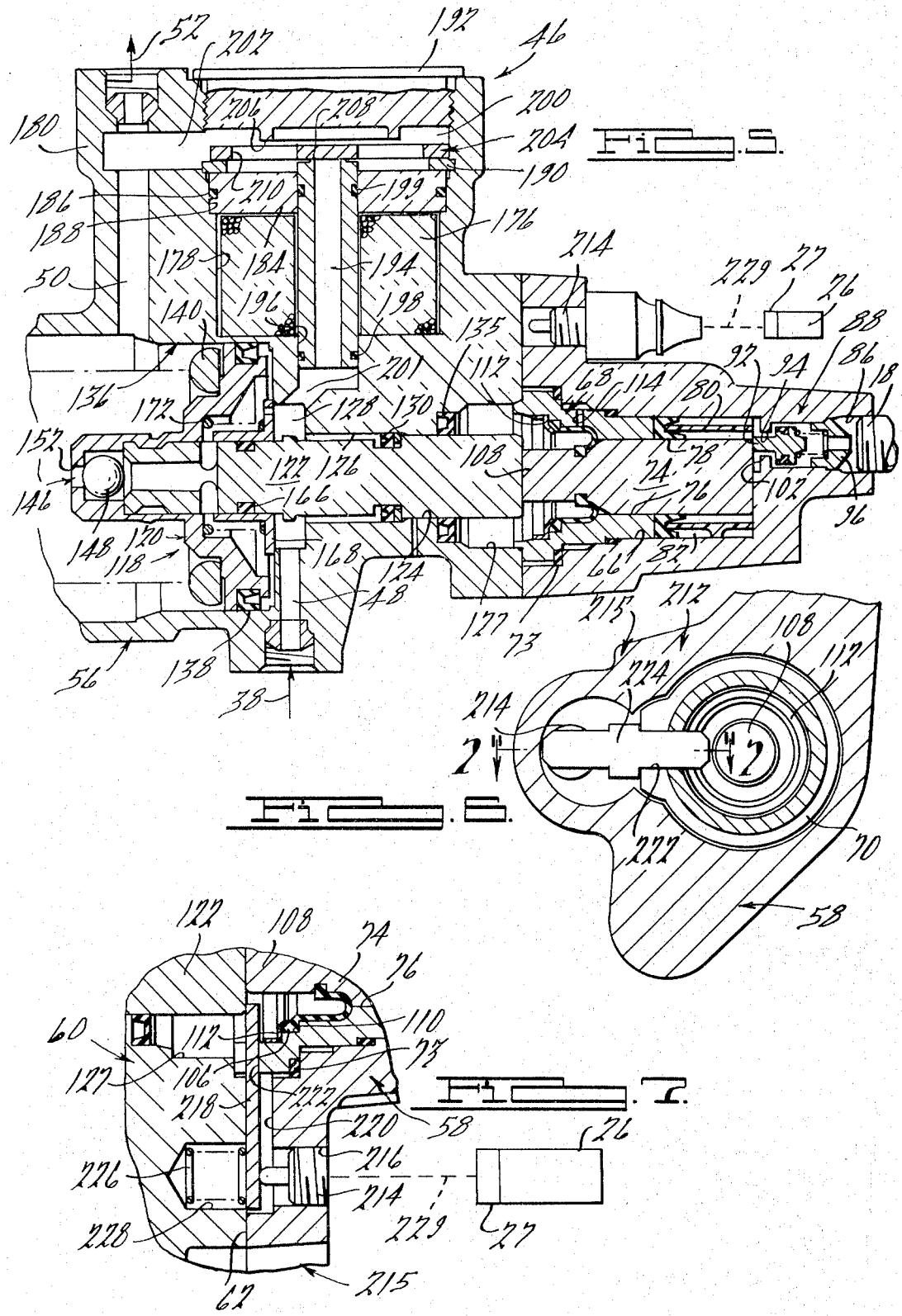

MODULATING VALVE FOR SKID CONTROL SYSTEM

This is a division of application Ser. No. 165,179, filed July 22, 1971 now U.S. Pat. No. 3,752,538.

SUMMARY BACKGROUND OF THE INVENTION

The present invention relates to brake pressure modulating valves for a skid control system and more particularly to a modulating valve operable from an auxiliary source of fluid pressure as provided for a vehicle, i.e. power steering pump.

The modulating valve of the present invention is operable from a source of hydraulic pressure and hence, in comparison to valves operable from vehicle vacuum, is relatively compact and hence requires only a small amount of mounting space.

The valve is designed to operate in an open center pump and hence can be operated by fluid pressure from a power steering pump and can be serially connected with that pump and the power steering mechanism.

The valve of the present invention has a piston which is urged by the bias on a spring to normally maintain the valve in its deactuated position. One side of the piston is connected to the outlet or high pressure side of a power steering pump and the opposite side is connected to the tank or return side. When the valve is actuated, as in response to a skid control signal, pressure builds up on the one side of the piston causing it to move against the spring whereby the valve is actuated. The piston has a check valve which, when the piston nears the end of its stroke, is opened whereby fluid to the power steering mechanism and the return side of the pump is through the check valve.

The valve of the present invention also is provided with a novel secondary seal in that portion of the valve connected to the brake lines of the vehicle; this secondary seal permits vacuum bleeding of the brake lines in a manner to be seen.

Therefore, it is an object of the present invention to provide a new and improved modulating valve for a skid control system.

It is another object of the present invention to provide new and improved modulating valve for a skid control system operable on a hydraulic system including the power steering pump.

It is still another object of the present invention to provide a new and improved modulating valve for a skid control system having an actuating piston operable in an open center hydraulic system and with the piston having a position actuated check valve for permitting flow through the valve when the piston has reached a selected position.

It is another object of the present invention to provide a new and improved modulating valve for a skid control system having a secondary seal in the portion connected to the brake lines which seal facilitates vacuum bleeding of the brake lines.

Other objects, features, and advantages of the present invention will become apparent from the subsequent description and the appended claims, taken in conjunction with the accompanying drawings, in which:

FIG. 3 is a longitudinal sectional view of the modulating valve of the skid control system of FIG. 1 and 2;

FIG. 4 is a sectional view of the valve of FIG. 3 taken generally along the lines 4—4;

FIG. 5 is a sectional view of the valve of FIG. 3 taken generally along the lines 5—5;

FIG. 6 is a sectional view of the valve of FIG. 3 taken generally along the lines 6—6; and FIG. 7 is a sectional view taken generally along the lines 7—7 in FIG. 6.

The skid control system of the present invention can be utilized and will be described specifically for use with an automotive vehicle; however, it should be understood that features of the invention could be utilized with other types of wheeled vehicles including aircraft. For an automotive vehicle, the system of the present invention can be utilized in connection either with the front wheels, the rear wheels or the front and rear wheels. The system will be described for use in conjunction only with the rear wheels of an automotive vehicle.

Figure 1:
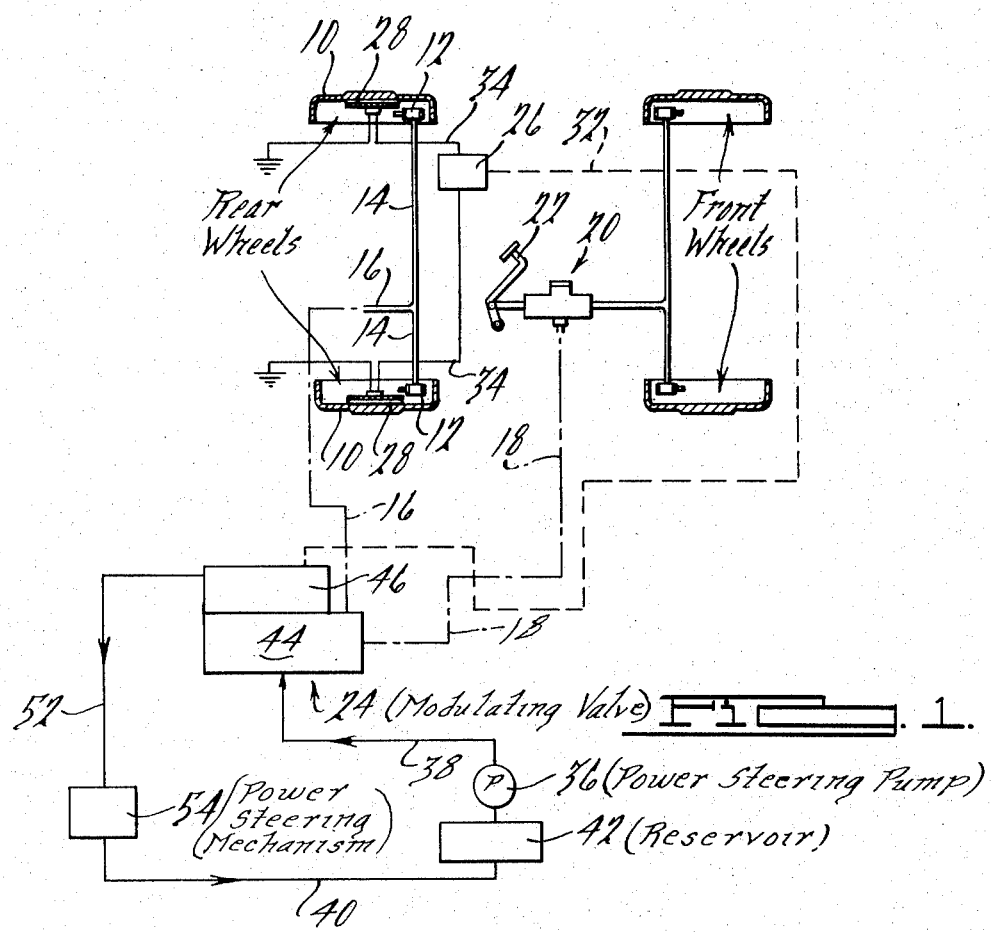
FIG. 1 is a schematic diagram depicting the system of the present invention in conjunction with the brake system of a vehicle.

Looking now to FIG. 1, the schematic diagram generally shows the skid control system for use with the rear wheels of an automotive vehicle with the rear wheels being equipped with brake drums 10 and wheel brake cylinders 12. Hydraulic lines 14 are connected to the cylinders 12 and to a common fluid line 16 which is pressurized by a master cylinder assembly 20 via a line 18. The master cylinder assembly 20 can be of a conventional construction and actuated through a foot pedal 22. The fluid pressure from master cylinder 20 can be modulated by means of a modulating valve 24 which is connected between the fluid lines 18 and 16. Thus, the modulating valve 24 can control the fluid pressure to the wheel brake cylinders 12 and hence can control the operation of the brakes.

The modulating valve 24 in the present system is actuated in accordance with an electrical signal obtained from an electrical control module 26. The control module 26 receives information from sensors 28 associated with each of the brake drums 10. The sensors 28 generally provide a pulsating or alternating electrical signal via conductors 34 to the module 26 which signal would be an indication of the rotational velocity of the associated wheels.

The control module 26 can be constructed to sense the rate of change in the signal at the conductors 34 and hence to sense the deceleration rate of the wheels associated with the brake drums 10 and to provide an output signal in response to the magnitude of the deceleration of the wheels associated with the brake drums 10 reaching a preselected magnitude corresponding to a skid condition existing or to be occurring at the wheels associated with drums 10. The output or control signal will be transmitted by means of conductor 32 to the modulating valve 24. The control module 26 can provide an "on" or "off" signal and modulation of the fluid pressure to the brake cylinders 12 will be provided by the modulating valve 24.

Figure 2:
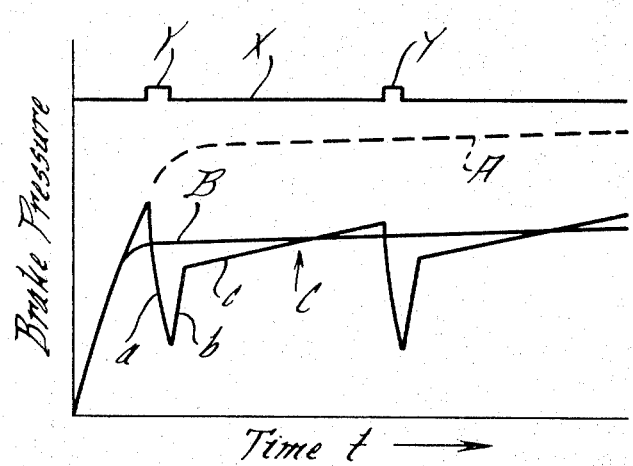
FIG. 2 is a curve of brake pressure versus time showing the skid control cycle of the skid control system of the present invention.

The skid control system of the present invention for fluid actuated brakes for braking of the vehicle varies or controls the fluid pressure to the brake system. Considering now a hydraulic system for the brakes on automotive vehicles. FIG. 2 is a graph showing the relationship between brake pressure and time. Curve A depicts the relationship of brake fluid pressure and time for a conventional brake system in which the pressure is increased from zero to the maximum fluid pressure available in the system. Under certain road conditions application of maximum brake pressure (or less) will result in excessive slip and a locked-wheel and/or skid condition. If the vehicle wheels are locked or are slipping excessively, the coefficient of friction between the surface of the road and the vehicle tire decreases and the effectiveness of the brake system in stopping the vehicle is reduced. Wheel slip has been defined as the ratio of the difference between car velocity ($V_c$) and braked wheel velocity ($V_w$) to car velocity ($V_c$) or ($V_c - V_w$)/$V_c$. The brake pressure curve for braking the vehicle at desired slip for utilizing the maximum coefficient of friction is shown as curve B. Brake pressures above curve B pressures will result in excessive wheel slip. It can be seen that the maximum pressure of curve B is less than the maximum obtainable pressure of the system (curve A) and hence indicates that relief from the maximum brake pressure is desirable in order to stop the vehicle in the shortest distance. It is a function of the system of the present invention to provide operational characteristics which tend to simulate the ideal brake pressure curve B. Note that depending upon the surface conditions the ideal curve B will vary hence a family of ideal pressure curves could be constructed for different road conditions.

In the system of the present invention, the modulating valve 24 in response to the output signals from the module 26 will provide for a modulated brake pressure generally following curve C. The curve C approximates the ideal brake pressure curve B. The curve X depicts the output from module 26 and shows the time relation between output control signals y and pressure curve C.

The modulating valve 24 is in an open center hydraulic system and in a preferred form for an automotive application is located in the hydraulic circuit for the vehicle power steering. Looking to FIG. 1 this hydraulic circuit includes a continuous flow hydraulic pump 36 which has its outlet connected to an outlet line 38 and which has its return connected to a return line 40 via a reservoir 42. The modulating valve 24 includes an actuator assembly 44 and a control valve assembly 46 (both of which are shown schematically only in FIG. 1). The actuator assembly 44, as seen in FIG. 1, is interposed between brake lines 16 and 18 and is operable, in a manner to be seen, to modulate the pressure to the brakes. The valve 24 is connected to the high pressure line 38 via line 48 connected to assembly 44 and is connected to return line 40 via line 52 connected to the control valve assembly 46. The vehicle power steering mechanism 54 is located between return lines 52 and 40 and hence is in series with the modulating valve 24. The valve assembly 46 is electromagnetically operated and as will be seen is actuated in response to the control signals y at conductor 32 as generated by module 26 to control the actuation of actuator assembly 44.

Looking now to FIGS. 3 and 5, the actuator assembly 44 includes a longitudinally extending housing assembly 56 defined by a pair of housing members 58 and 60 which are connected together and have engaging surfaces 62 and 64, respectively.

The housing member 58 is provided with a stepped bore 66 in which there is supported a complementarily stepped bearing structure 68. The bearing 68 is axially held by engagement of an outer face 70 with the surface 64 of housing 60. Seals 72 and 73 are located and provide a seal between confronting stepped portions of bore 66 and the outer surface of bearing 68. A plunger 74 is slidably supported in a through bore 76 in the bearing structure 68 and an annular lip seal 78 and seal retainer 80 provide a seal between the bore 66 and plunger 74 whereby a chamber 82 is defined. An outlet 84 connects the chamber 82 to the brake line 16 to the rear brakes while an inlet 86 connects the chamber 82 to the master cylinder 20 via line 18. A check valve assembly 88 is located in inlet 86 and has a valve body 90 having a reduced diameter stem portion 92 which normally extends through a reduced diameter bore portion 94 of inlet 86. The valve body 90 is normally urged, via the bias on a spring 92 supported in a hydraulic fitting 96, towards the chamber 82 and hence the stem portion 92 is normally urged into engagement with the plunger 74. A resilient seal 98 is supported on valve body 90 and when stem portion 92 engages plunger 74, seal 98 is located out of engagement with the confronting sealing surface 100. Thus normally fluid is freely communicated from inlet 86 to chamber 82; however, when the plunger 74 is moved to the left and partially out of chamber 82, the seal 98 engages surface 100 to seal the inlet from chamber 82. This serves a purpose to be described. An oblong recess 102 (FIGS. 4 and 5) is formed in the surface 104 against which plunger 74 is normally urged. The recess 102 provides a fluid path around the confronting end of the plunger 74 when that end of plunger engages the surface 104. In the event of a skid condition skid control signal y will be transmitted to the modulating valve 24 whereby it will be actuated (in a manner to be seen) to release the plunger 74. The plunger 74 will be moved to the left partially out of the chamber 82 resulting in the volume of chamber 82 being increased. This will cause a decrease in brake pressure at the rear brakes via line 16 whereby the brakes will be relieved and the skid condition inhibited.

An annular diaphragm seal 106 is secured at its radially inner end to a reduced diameter end portion 108 of plunger 74 and its radially outer end to a counter bore 110 in the bearing 68. The outer end of seal 106 is held by a retainer 112. The seal 106 functions to keep atmospheric air out of the rear brake line during vacuum bleeding of the line. The lip seal 78 would not normally be effective to keep air out during vacuum bleeding since air at atmospheric pressure would leak past the radially inner lip. The seal 106, on the other hand, will be tightly engaged between the bearing 68 and plunger 74 to enhance sealing therebetween during vacuum bleeding. The seal 106, of course, will readily flex to permit relative movement between plunger 74 and bearing 68. Air vents 114 and 116, which permit the escape of any brake fluid that might leak past seal 78, are blocked by seal 106 during vacuum bleeding.

The plunger 74 is urged by rear brake pressure to move out of chamber 82 but is normally held in engagement with surface 104 whereby check valve assembly 88 is held open. The plunger 74 is held in the latter position by a piston assembly 118 which is supported in housing member 60.

The piston assembly 118 includes an enlarged head 120 which is fixed to one end of a rod 122 via a crimped connection 123 at that one end. The rod 122 has its opposite end slidably supported in a bore 124 with that end extending into a counterbore 127 which confronts the counterbore 110 of the bearing member 68. The slidably supported end of rod 122 is engageable with the adjacent end of plunger 74 and (in a manner to be seen) normally holds the plunger 74 with its opposite end engaging the surface 104. The support bore 124 communicates with a pair of successively stepped bores 126 and 128. A lip seal 130 is carried in a groove 132 in the rod 122 and sealingly engages the step bore 126. It has been common practice to locate a seal upon a shaft to engage the same surface as that upon which the shaft is slidably supported. Since the rod 122 is supported in a support bore 124 and does not engage bore 126 the sealing bore 126 will not be subject to the wear that support bore 124 will encounter and hence will maintain a smooth surface finish to enhance sealing. A lip seal 135 is supported in a reduced diameter portion of bore 127 and proves a seal with piston 122. A vent 137 communicates the bore 124 between piston seals 130 and 135 to atmosphere.

The bores 126 and 128 are in communication with high pressure line 38 via bore 48 whereby fluid under pressure can be communicated thereto. Bores 126 and 128 communicate with an enlarged bore 136 in which the enlarged piston head 120 is slidably supported. A lip seal 138 carried by the piston head 120 provides a seal with the bore 136. The piston assembly 118 is urged to the right, with rod 122 holding plunger 74 in its deactuated position by the bias of spring 140. The spring 140 acts between a cap 142, which seals the opposite end of bore 136, and the piston head 120. The bias of the spring 140 is selected to be of sufficient magnitude to react the force on plunger 74 and to hold the plunger 74 deactuated over the full range of pressure from the master cylinder 20 and in line 18.

Looking now to FIGS. 1, 3 and 5, while the one side of bore 136 (and hence piston head 120) is connected to the pressure line 38 (via passage 48) from the power steering pump 36, the opposite side of bore 136 (and piston head 120) is connected to return line 52 via a passageway 50 through valve assembly 46 to the power steering mechanism 54 and to tank via line 40. Normally (in a manner to be seen) the valve assembly 46 is in an open condition and directly connects lines 38 and 52 (via passage 48, bores 126, 128 etc.) and provides a by-pass path around the bore 136. In this condition both sides of bore 136 are substantially at the same pressure and piston assembly 118 is deactuated. Upon the occurrence of a skid control signal (signal y) the valve assembly 46 is actuated to closed condition to block that direct connection between lines 38 and 42. With the by-pass now closed, the rod end of bore 136 is pressurized and the fluid flow path to reservoir 42 must go through the bore 136 via passageway 50 which is connected to the head end of bore 136. The pressure on the rod end of piston assembly 118 results in a force which overcomes the bias of spring 140 whereby the piston assembly 118 will be moved to the left away from the plunger 74. As this occurs fluid at the head end of bore 136 will be forced out back to the reservoir 42 via passagway 50 and line 52. Since the brakes have been applied by the vehicle operator the chamber 82 will be pressurized and this pressure will act on plunger 74 moving it to the left to follow the piston rod 122. As previously noted when the plunger 74 has moved away from surface 104 the check valve assembly 88 will close preventing any further increase in pressure in chamber 82 and the movement of plunger 74 out of chamber 82 will result in a decrease in pressure to the associated brakes.

The piston head 120 has a centrally located nose portion 144 in which is located a ball check valve assembly 146. The assembly 146 includes a ball 148 located in a cavity 150 which terminates in a reduced diameter through bore 152. The bore 152 has a valve seat cooperating with the ball 148. The end of rod 122 connected to piston head 120 terminates adjacent the cavity 150 and has an axial bore 154 communicating with cavity 150 and a through cross bore 156. The confronting end of rod 122 traps the ball 148 in cavity 150. The cross bore 156 communicates the rod end of bore 136 with bore 154 and cavity 150. During actuation, the difference in fluid pressure in bore 136 on opposite sides of piston head 120 will seat the ball 148 to close the bore 152. As the piston assembly 118 moves, fluid from the head end of bore 136 flows out of passageway 50 to line 52 to return the reservoir 42. The movement of the piston assembly 118 is stopped at a preselected location by means of a pin 158 which is fixed to cap 142 in axial alignment with bore 152 of check valve assembly 146. While the pin 158 is of a larger diameter than the bore 152 a tip 160 at the end of pin 158 is of a smaller diameter and is adapted to engage the ball 148 and unseat it. In this position fluid can then flow through the bore 152 to the reservoir 42 and the pressure will be maintained on the rod end of piston assembly 118 at a magnitude just sufficient to hold it in such position. In any event the piston assembly 118 will be stopped when it engages the large diameter portion of the pin 158. With the piston assembly 118 in its extreme position, the plunger 74 can move to its extreme position out of chamber 82 thereby providing maximum relief of brake pressure. When the skid control signal (y) is terminated the valve assembly 46 will be opened again and the rod end of bore 136 will again be shunted or by-passed resulting in the pressure at the rod end of bore 136 dropping rapidly, in this condition the spring 140 will initiate the return of piston assembly 118 and hence the plunger 74 towards their original positions. This will result in the rapid reapplication of brake pressure. Looking to FIG. 2, the rapid relief of brake pressure occurs for the duration of the skid control signal (y) and is represented by the portion *a* of curve C; the initial reapplication of brake pressure upon termination of the signal (y) occurs rapidly and is represented by the portion *b* of curve C. It is desirable, after a rapid initial reapplication of brake pressure to provide a slower rate of reapplication whereby the ideal pressure curve B will be more closely simulated. This is done by the throttle valve assembly 162 which operated to provide portion *c* of curve C. The throttle valve assembly 162 includes a cap shaped valve member 164 which is slidably supported on rod 122 near its crimped end. A seal 166 provides a seal between valve member 164 and rod 122. The valve member 164 includes a flange 168 which is adapted to engage the surface 170 around bore 128 to block it from communication with bore 136. A relatively light spring 172 normally holds the valve member 164 in a position with flange 168 engaging surface 170. When the bore 128 is pressurized (as when valve assembly 46 is actuated to its closed position), the valve member 164 will be easily unseated and will generally not affect the operation of the actuating assembly 44 during this portion of the cycle (portion *a* of curve C). With the piston assembly 122 in its extreme actuated position (adjacent pin 158) the valve member 164 will be held away from surface 170 by engagement with a shoulder 173 located on rod 122. When the valve assembly 46 (is deactuated and the pressure in bore 128 drops, the piston assembly will be initially rapidly returned and the valve member 164 will still have no effect since it is then engaged with shoulder 173 portion *c* of curve C). Prior to completion of the return of piston assembly 118, the valve member 164 will engage surface 170 and the return of fluid back to reservoir 42 will be blocked. A bleed hole 174 in the flange 168 of valve 164 provides for the return of fluid at a selected, reduced rate such that the return of piston assembly 118 and hence of plunger 74 to their original positions will be at the selected reduced rate (portion *c* of curve C) to simulate the ideal pressure curve B. As noted, the actuation of actuating assembly 44 is controlled by valve assembly 46, which is shown in FIG. 5.

The valve assembly 46 is an electromagnetically actuated valve which has an annular coil member 176 supported in a stepped bore 178 in a housing portion 180 which is an integral part of housing 60. The coil member 176 is electrically connected to module 26 via conductor connector 182 which is connected to conductor 32. The coil 176 is held in place by an aluminum sealing ring 184 which has its outer surface sealed relative to bore 178 via an annular seal 186. The sealing ring 184 is held against a shoulder 188 in bore 178 via a retaining ring 190. The end of bore 178 is sealingly closed by a threaded cap member 192.

A tubular conduit member 194, of magnetic material has one end located in a reduced diameter bore 196 which connects with bore 178. Conduit member 194 extends through coil 176 and sealing ring 184 and has its outer periphery sealed relative to bore 196 and the ring 184 via seals 198 and 199 respectively. The bore 196 communicates with a port 201 which is connected with bores 128 and 126 and hence with line 38 via passageway 48. In this way bore 196 can receive fluid under pressure from the outlet of pump 36.

A chamber 200 is defined between the cap 192 and sealing ring 184 and is connected to passageway 50 and hence is connected to return line 52. A valve plate 204, of magnetic material, is located to float or slide in chamber 200 between an annular ring portion 206 on cap 192 and an extending lip 208 at the outlet end of conduit 194. When the coil 176 is de-energized (via termination of signal y at connector 182) the valve plate 204 will be easily moved away from lip 208 and against ring portion 206 by the fluid pressure in conduit 194 and fluid will flow to bore 202 via openings 210 in valve plate 204 and thence to line 52 via passageway 50. In this condition the actuating assembly 44, in a sense, will be by-passed from high actuating fluid pressure and will not be actuated (since both sides of piston assembly 118 will be at the same magnitude of fluid pressure). When a skid control signal (y) is generated, the coil 176 will be energized and the valve plate acting as an armature will be pulled into engagement with the lip 208 to block off the passage through conduit 194. The housing portion 180, made of a ferrous material, acts as a part of the magnetic path. In this condition the rod end of cylinder bore 126 will be pressurized and the piston assembly 118 will be actuated as described. When the skid control signal (y) is terminated the valve plate 204 will be released to move away from lip 208 to again provide a relief or by-pass path for the rod end of bore 136 whereby the actuator assembly 44 will be deactuated.

It is desirable to monitor the operation of the actuator assembly 44 in order to determine any possible malfunction to provide an indication to the vehicle operator in the event of such an occurrence. This is done by a timing circuit 27 in the module 26 which times the cycle of operation of the actuator assembly 44 (curve C) and in the event time for each cycle exceeds a selected maximum a signal is provided for the vehicle operator indicating that a malfunction has occurred. The timing is performed as a function of the movement of piston assembly 118 and the initiation and termination of timing being provided in response to signals from a position indicating switch assembly 212.

The assembly 212, shown in FIGS. 6 and 7, is mounted in a housing portion 215 which is defined by both housing 58 and 60. The assembly 212 includes a switch 214 mounted in a bore 216 in housing 58 and which is actuated by a flat actuating bar 218. The bar 218 is located in a slot 220 in surface 62 of housing 58 and extends upwardly from bore 216 generally into the counterbore 110 of bearing 68 and generally into counterbore 127. The bearing 68 has a slot 222 which receives the extending portion of bar 218; an enlarged portion 224 of bar 218 limits the movement of bar 218 into the counterbore 110. The bar 218 is located to extend to a position in line with the free end of rod 122 such that when the rod 122 is in its deactuated position it will engage the one end of bar 218 and pivot it about the engaging surface of slot 222 to move its opposite end away from switch 214. Upon actuation, the rod 122 will move away from bar 218 and a spring 226 in engagement with the opposite end of the bar 218 will reverse pivot the bar 218 to engage the switch 214. The spring 226 is located in a bore 228 in housing 60 in confrontation with switch 214 in housing 58 and is biased to normally urge the bar 218 to pivot into engagement with the switch 214. The condition of the switch 214 (i.e., open or closed) will be changed by the bar 218 as it is pivoted from its alternate positions by the action of the rod 122 and spring 226. This change of condition will be sensed by the timing circuit 27 in module 26 via conductor 229. The timing is initiated as the rod 122 is actuated away from bar 218 and timing terminated when the rod 122 moves back again into engagement with rod 122. Note that it is desirable that the timing function be initiated as precisely as possible when the check valve 88 is closed and terminated when it is opened. This is to be sure that the failure timing circuit detects a situation in which the plunger 74 is not moved all the way back to its original position opening the check valve 88 and permitting control of the brake pressure by the vehicle operator again. The actuation of switch 214 requires a certain amount of motion greater than that required to open or close the check valve 88. Since the opening and closing of check valve 88 occurs with very little travel, the sensitivity of the switch assembly 212 is increased by using the pivoted bar 218 which provides a mechanical advantage or amplification of travel. Thus, for a small distance of the rod 122 the actuating end of the bar 218 which actuates switch 214 will travel a substantially greater distance; this provides an advantageous means of sensing slight distance of travel of rod 122 and hence the slight distance required to open and close check valve 88 while still providing adequate motion to mechanically actuate the switch 214.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In an automotive vehicle having (a) a power steering system which includes a hydraulic pump and a power steering gear, (b) a hydraulically actuated brake system for at least one wheel, and (c) a skid control system for at least one wheel of the vehicle and including means for detecting an incipient skid condition and for providing a skid control signal in response thereto, the improvement comprising: a modulating valve including brake pressure modulating means comprising a fluid chamber located in the brake system and normally at least partially located within said chamber and a plunger slidably supported for movement out of said chamber for reducing the magnitude of pressure to the brakes and back to said chamber for restoring the magnitude of pressure, piston means operatively connected with said plunger for controlling movement of said plunger when actuated and including a piston slidably supported in a cylinder, spring means for exerting a preselected bias for holding said piston and said plunger in their deactuated positions in the absence of said signal, control valve means connected in a parallel fluid circuit with said cylinder for controlling the fluid pressure to opposite sides of said piston in said cylinder in response to said signal, hydraulic circuit means connecting said parallel fluid circuit in series circuit with the power steering pump and in series with the power steering gear, said hydraulic circuit means including hydraulic valve means carried by said piston normally blocking fluid flow between opposite sides of said piston and responsive to said piston being in a preselected, actuated position for communicating said cylinder on opposite sides of said piston, said hydraulic valve means comprising a check valve and with said hydraulic circuit means including a rod member located in said cylinder and engageable with said check valve to open it when said piston is in said preselected actuated position, said control valve means normally providing a by-pass path around said cylinder whereby the fluid pressure on opposite sides of said piston will be similar and responsive to said signal for blocking said by-pass path whereby said cylinder is in direct series connection in said series circuit for transmitting substantially all fluid flowing in said series circuit and for providing a preselected magnitude of pressure differential across said piston, said piston operable in response to said preselected differential for overcoming said bias whereby said piston will be moved and said plunger is moved to relieve brake pressure, and switch means connected with said piston for providing a monitor signal responsive to the movement of said piston.

2. The apparatus of claim 1 with said switch means comprising a switch member and an elongated switch arm having one end engageable by said piston and its opposite end engageable with said switch member to control its actuation, and pivot means for pivotally supporting said switch arm intermediate its ends at a position substantially more proximate to said one end whereby a slight motion of said piston and said one end will result in a substantially greater motion at said other end.

3. In an automotive vehicle having a hydraulically actuated brake system for at least one wheel including a master cylinder and a brake actuating fluid motor, and having a skid control system for at least one wheel of the vehicle and including means for detecting an incipient skid condition and for providing a skid control signal in response thereto, the improvement comprising: a modulating valve including brake pressure modulating means comprising a fluid chamber located in series hydraulic circuit between the master cylinder and fluid motor in the brake system and plunger means normally at least partially located within said chamber and slidably supported for movement out of said chamber for reducing the magnitude of pressure to the brakes and back to said chamber for restoring the magnitude of pressure, a check valve actuable by said plunger means for blocking fluid communication between the master cylinder and fluid motor when said plunger means is actuated in response to said control signal, switch means connected with said plunger means for providing a monitor signal responsive to the movement of said plunger means, said switch means comprising a switch member and an elongated switch arm having one end engageable by said plunger means and its opposite end engageable with said switch member to control its actuation, and pivot means for pivotally supporting said switch arm intermediate its ends at a position substantially more proximate to said one end whereby a slight motion of said plunger means and said one end will result in a substantially greater motion at said other end.

4. The apparatus of claim 3 with said plunger means comprising a plunger slidably supported in said fluid chamber and actuable to actuate said check valve, said plunger means further comprising a piston member actuable in response to said control signal to control actuation of said plunger, said switch arm having said one end engageable by said piston member.

5. The apparatus of claim 3 wherein said switch member is actuable in response to mechanical actuation requiring a greater length of travel than the actuation of said check valve.

* * * * *